PROCESS FOR THE SIMULTANEOUS DEHYDRATION AND PURIFYING OF ALCOHOL
Filed May 29, 1926
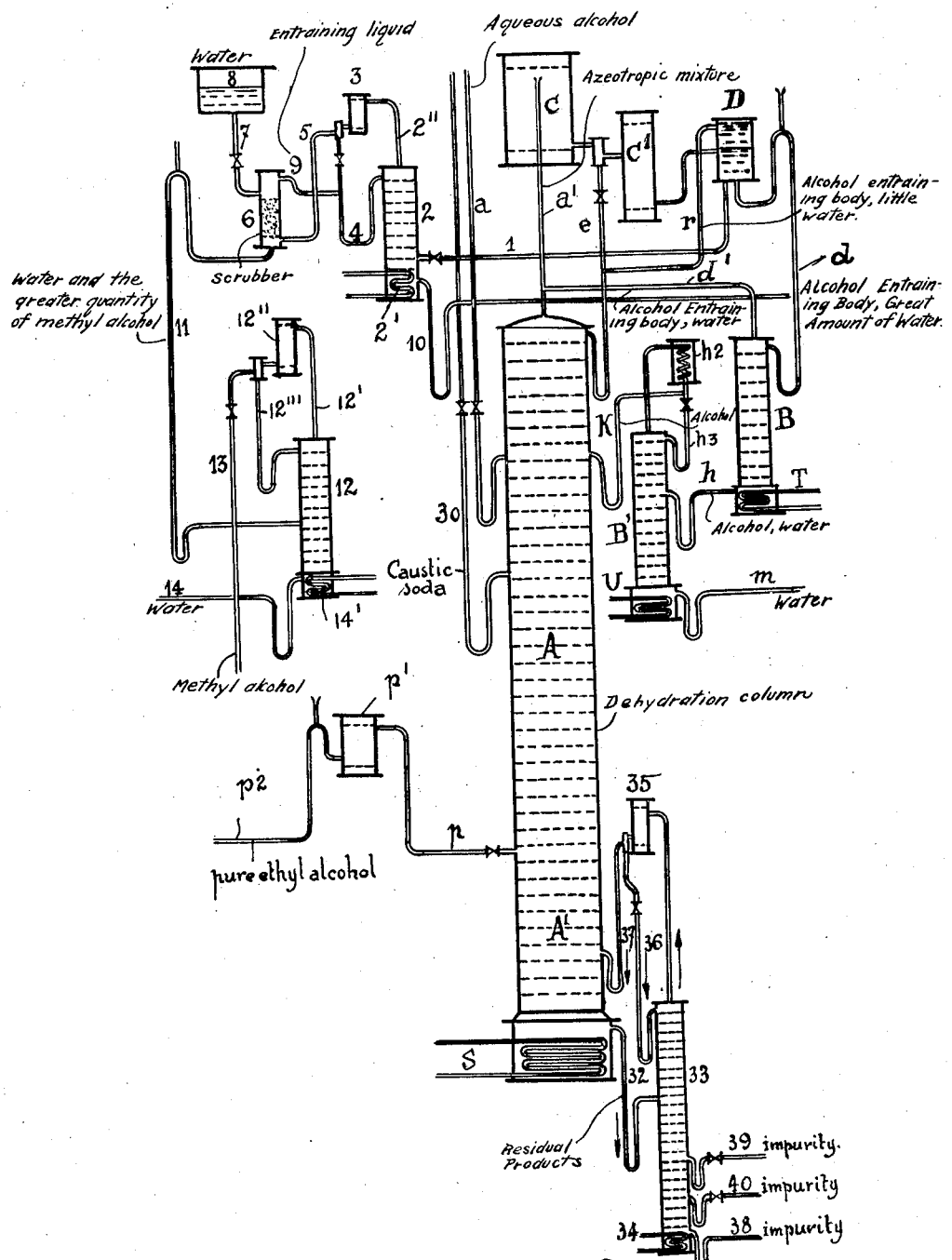

Patented Nov. 10, 1931

1,831,425

UNITED STATES PATENT OFFICE

ELOI RICARD, OF MELLE, FRANCE, ASSIGNOR, BY MESNE ASSIGNMENTS, TO U. S. INDUSTRIAL ALCOHOL CO., OF NEW YORK, N. Y., A CORPORATION OF WEST VIRGINIA

PROCESS FOR THE SIMULTANEOUS DEHYDRATION AND PURIFYING OF ALCOHOL

Original application filed November 20, 1925, Serial No. 70,319½, and in Belgium June 4, 1925. Divided and this application filed May 29, 1926. Serial No. 112,644.

The processes for the dehydration of alcohol utilizing the azeotropic mixtures are applicable, as is well known, to rectified alcohol which is substantially free from impurities, or to the alcohol which contains the first-distilled impurities such as acetaldehyde, acetone, methyl alcohol, or the like. Up to the present, no process has been proposed for dehydrating alcohols containing impurities other than the ones above mentioned.

The present invention has for its object a process for the simultaneous dehydration and purification of the alcohol containing impurities of a widely varying nature such as the ethers, acids and residual products in general, as well as to an apparatus whereby the said process is carried into effect. My said process is thus applicable chiefly to raw commercial alcohol, or to alcohols to be re-treated after their use as solvent in certain branches of manufacture.

The said process serves to eliminate the preliminary rectifications, which are often difficult to perform, to which these impure alcohols are now subjected.

While my invention is capable of embodiment in many different forms, I have shown only one form in the accompanying drawing, in which The figure is a diagrammatic representation of an apparatus which may be used in connection with my process.

My said process is carried out as follows:

1. I neutralize the acids and saponify the esters by the continuous (and measured) addition of alkali in the upper portion of the distilling apparatus, and at a point below the region in which the first-distilled products are being eliminated by the known method, the operation being thus performed in order to obviate resinifications with the said first-distilled products, because this would give rise to an odour which it would be difficult to eliminate.

The organic salts which are formed are still soluble in alcohol and in the residual products; they are brought to the lower part of the distilling apparatus whence they are discharged.

If the product contains acids but not ethers, I may optionally neutralize the acids by the continuous (and measured) addition of alkali. If the said products are not neutralized, they will act in the same manner as the residual products, and will be discharged therewith as above indicated.

2. I eliminate the residual products whose boiling point is higher than that of alcohol and which consists as a rule of the higher alcohols, acetal, aldol, croton-aldehyde, the furfurolic bases, amines, aldehydes of the fatty series, the heavy ethers which are not saponified, the volatile fatty acids, and the like, and for this purpose I cause the same to descend, during the dehydrating process, below the point of extraction of the ethyl alcohol, with which the said products descend in the main distilling apparatus, to which I add a certain number of plates upon which the said products will be concentrated.

I remove the said products in the state of liquid or vapour, by means of a discharge cock, and they are rectified in an auxiliary distilling apparatus whereby they are freed from ethyl alcohol.

All of the aforesaid residual products are insoluble or but slightly soluble in water, and will provide mixtures with a small amount of water which have a constant boiling point which can be distilled below 100° C. In fact, the presence of such a small amount of water which lowers the boiling point in the usual rectifying process, makes the separation of the said products very difficult when water is present. But in the absence of water, their relatively high boiling point remains unchanged, and this boiling point will thus exercise the maximum effect in their fractional distillation.

Thus for example, iso-amyl alcohol will distil at 95° C. when in the presence of a small quantity of water, and at 131° when it is anhydrous. In the first case, its boiling point differs from that of alcohol by only 16.5° while in the second case it differs by 53°.

The following example with reference to the appended drawing sets forth the operation of the process.

A dehydration column A furnished with all the accessories designated by the letters C, C', D, B, B', and which have been described in detail in my application for Letters Patent Serial No. 70,319½, filed November 20, 1925, of which the present application is a division, is fed with crude alcohol and at the beginning of the process with an entraining liquid such as benzol in a sufficient quantity to produce an azeotropic distillate by the tube $a$. The column A is heated with a steam heating coil S. The resulting vapors evolved through a pipe $a'$ are condensed in a condenser C. A part of the hot liquid returns to the column A through a pipe $e$. Another part is cooled in a cooling apparatus C' and is discharged into a separating chamber D in which it separates into two layers. Each layer contains the three substances, water, ethyl alcohol and an entraining liquid such as benzol, for example. One layer, for instance the top layer, contains the major part of the entraining liquid which is returned to the column A through a conduit $r$. The second layer, herein the bottom layer, is treated in a small distilling apparatus B and B'.

The apparatus B is comprised of a column provided with a steam coil T and serves to remove the whole of the entraining liquid from the liquid layer, which is supplied thereto through a pipe $d$. The entraining liquid is drawn off from the column B as a vapor mingled with a small amount of a vapor of the other two constituents of the layer and, thus, returned to the pipe $a'$ by the pipe $d'$. The other two constituents, comprising alcohol and water, are drawn off from the column B into the column B' through a pipe $h$. The column B' is heated by a steam coil U and serves to remove, in the form of a vapor, alcohol of a high strength through the pipe $h$ to a condenser $h2$, which delivers the condensate partly to the top of the column B' by a valved pipe $h3$, but mainly by a pipe $k$ to the dehydrating column A. The water is discharged from the column B' by an outlet pipe $m$. The absolute alcohol is discharged from the dehydrating column A by means of a valved outlet pipe $p$, which is connected to a cooler $p'$ having a vented outlet pipe $p2$. The head products, such as acetic aldehyde, acetone and methyl alcohol, are eliminated and recovered according to the method using the apparatus carrying the reference numbers 1 to 14, and which has been also described in my application for Letters Patent No. 70,319½, filed November 20, 1925. In the case where an apparatus of this type is fed with an alcohol containing 5%, for example, of methyl alcohol, it would be found that methyl alcohol has no exit from the apparatus. For this purpose I have provided a valved pipe 1 for drawing off from the separating chamber D a part of the decanted layer, in this instance the lower layer, in which the methyl alcohol is found in the greatest quantity. This is conveyed by the pipe 1 to a distilling column 2 provided with a steam heating coil 2'. The mixture therein is distilled so as to form a binary azeotropic mixture which collects at the top of the column 2 and is driven off through a pipe 2'' to a condenser 3. A part of the condensate flows back through a pipe 4 to the top of the column 2 and a part is discharged through a conduit 5 into a scrubber 6 of the baffle type. Water from the tank 8 is delivered through a valved pipe 7 to the scrubber 6. Water dissolves the methyl alcohol, thus producing a plurality of layers therein with the methyl alcohol mainly in the lower layer. The upper layer containing the remaining quantity of the entraining liquid, flows away from the top of the separating chamber, thence to the pipe 4 and thence to the top of the column 2. The liquid at the lower part of the column 2 is very poor in methyl alcohol and is returned through a conduit 10 to the pipe $d$ and thence to the distilling column B. The lower layer in the scrubber 6 is carried off by a vented pipe 11 to a distilling column 12 in which the two liquids, comprising methyl alcohol and water, are separated. The methyl alcohol is evolved from the top of the column in the form of a vapor and conveyed by a pipe 12' to a condenser 12'', part of the liquid condensed being returned by a pipe 12''', to the column 12, and the remainder being carried off by a valved outlet 13. The water from the column 12 is carried away by an outlet pipe 14. For heating the column 12 there is, as shown in the drawing, a steam heating coil 14'. By carrying out the process in this manner I have obtained a continuous abstraction of the methyl alcohol, thus avoiding the accumulation of the methyl alcohol in the top of the distilling apparatus so that, as a consequence, the distilling process may be carried on continuously without any interruption.

I will suppose that the other impurities to be eliminated by the present process exist in the crude alcohol in the following amounts; 1 molecule of acetic acid, as 60 grams, for each hectoliter of alcohol; 2 molecules of acetic ether, as 172 grams; 4 molecules of other alcohols (methyl, isobutyl, propyl, etc.).

The acetic ether and acetic acid have a tendency to accumulate in the middle part of the column A. I introduce by the tube 30 placed a little below the tube $a$ a solution of caustic soda of 36° Bé. diluted in a liter of alcohol, and I prepare this solution so that the liter of liquid contains 3 molecules of soda, as 122 grams.

For each hectoliter of alcohol introduced by the tube $a$ I introduce by the tube 30 a liter of the soda solution. In the course of the heating the soda solution spreads on the plates and reacts with the impurities. 1 molecule of soda neutralizes 1 molecule of acid and the two other molecules of soda saponify the two other molecules of acetic ether. The organic salts of soda in being produced, are dissolved in the alcohol and descend toward the bottom where they are evacuated with the tail products.

The column A, for the purpose which has been explained above, is provided with the usual alcohol column plates and is elongated at the lower end being provided with some additional plates A'.

The extraction of the anhydrous ethyl alcohol is accomplished, as is well understood, through the pipe $p$ in the form of a vapor for condensation, etc. The extraction of the raw tail products is made by a pipe 32. These products enter into a little column 33 heated with a surface heater 34. The vapors pass to a condenser 35, one part being carried back by the pipe 36 and the other part entering into the principal column by a pipe 37. The concentrated tail products containing a solution of organic salts of the alkali, and the four molecules of the higher alcohols, are extracted in a mixture at the lowest end of the column 33 by a pipe 38, or by outlets at different heights according to their boiling point, by tubes 39 and 40.

It is obvious that without departing from the spirit of the present invention, it may be suitably modified in detail.

What I claim is:

1. The process for the dehydration of aqueous ethyl alcohol containing an entraining liquid and an impurity such as will react with an alkali, comprising adding to the liquid being distilled an alkali for reacting with the impurity, subjecting the alcohol to dehydration by distillation by evolving an azeotropic mixture of the alcohol, entraining liquid and water, extracting the impurity product of reaction from the residual alcohol being dehydrated and subjecting the impurity product of reaction to distillation to remove the anhydrous alcohol therefrom.

2. The process for the dehydration of aqueous ethyl alcohol containing an entraining liquid and impurities, including constituents capable of being distilled off first and organic acids, which comprises adding to the liquid being distilled an alkali for neutralizing the acids which form the residual impurities as organic salts, separating the first-distilled impurities, subjecting the alcohol to a process of dehydration by distillation to obtain anhydrous alcohol by evolving an azeotropic mixture of the alcohol, entraining liquid and water, extracting the organic salts after the removal of the anhydrous alcohol and subjecting the organic salts to distillation to remove ethyl alcohol therefrom.

3. The process for the dehydration of aqueous ethyl alcohol containing an entraining liquid and impurities, including constituents capable of being distilled off first, organic acids and organic esters, which comprises adding an alkali to the liquid being distilled in order to neutralize the acids forming the residual impurities to form organic salts and to saponify the esters which also form the residual impurities, removing the first-distilled impurities, dehydrating the alcohol by a dehydration process of distillation by evolving an azeotropic mixture of the alcohol, entraining liquid and water, separating the distillate containing the first-distilled impurities which forms into separate layers by decantation and treatment of the layer which contains the major part of the impurities, extracting the resulting organic salts as a residue and subjecting the organic salts to distillation to remove ethyl alcohol therefrom.

4. The process for the dehydration of aqueous ethyl alcohol containing an entraining liquid and impurities, including constituents capable of being distilled off first, organic acids and organic esters, which comprises adding an alkali to the liquid being distilled in order to neutralize the acids forming the residual impurities to form organic salts and to saponify the esters which also form the residual impurities, removing the first-distilled impurities, dehydrating the alcohol by a dehydration process of distillation by evolving an azeotropic mixture of the alcohol, entraining liquid and water, separating the distillate containing the first-distilled impurities which forms into separate layers by decantation and treatment of the layer which contains the major part of the impurities, concentrating the residual impurities, extracting the said impurities as a residue, subjecting the same to distillation in order to separa e by the first distillation the ethyl alcohol which is returned to the liquid being dehydrated and to remove the various impurities therefrom.

In testimony whereof I have signed this specification.

ELOI RICARD.